: 3,029,870
Patented Apr. 17, 1962

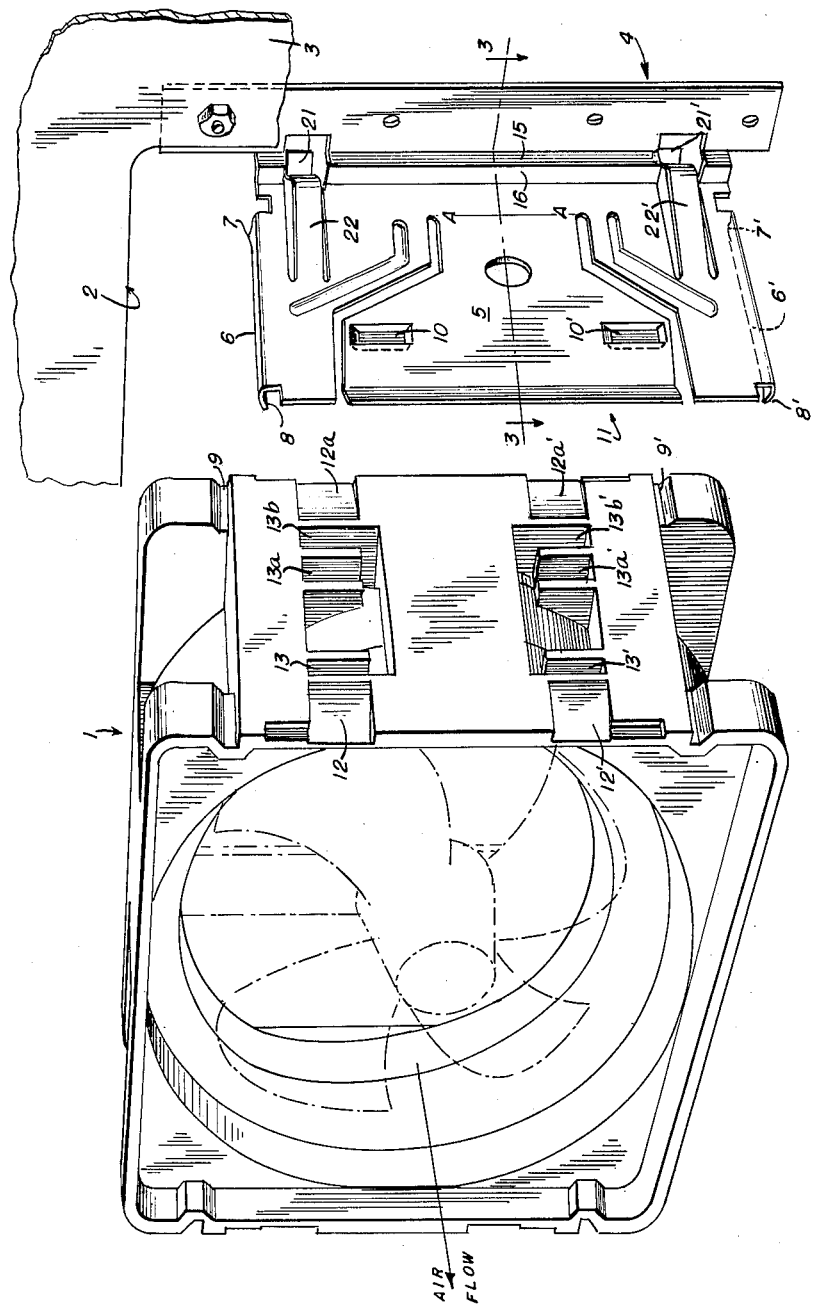

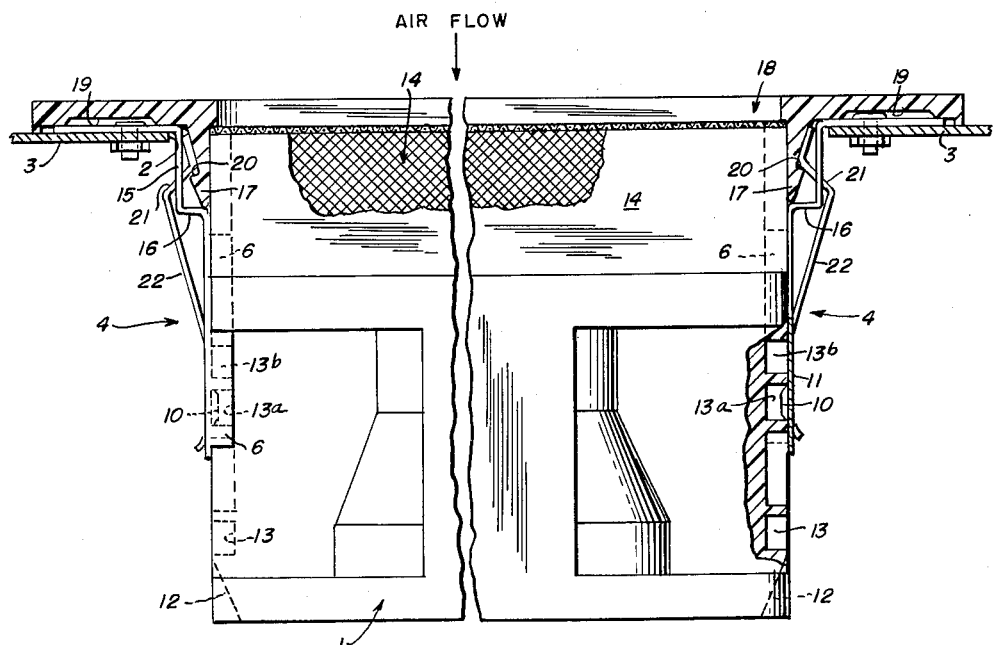
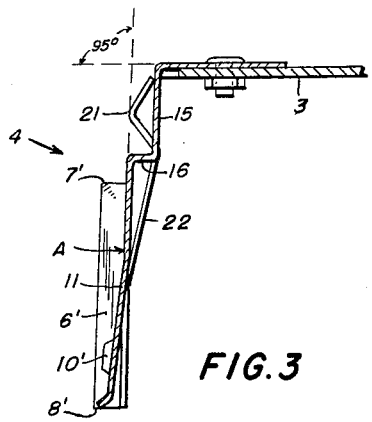
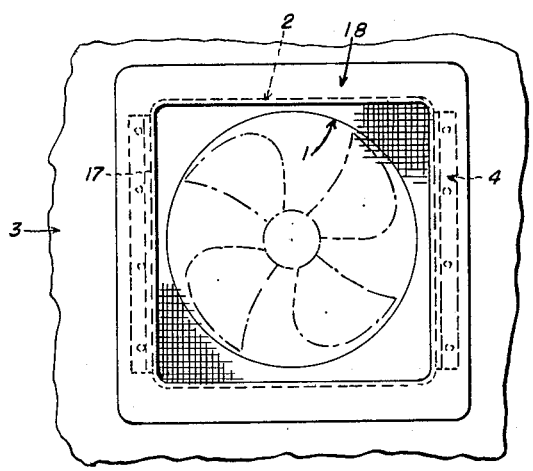

3,029,870
MOUNTING MEANS FOR FANS AND THE LIKE
Richard V. Heller, Woodstock, N.Y., assignor to Rotron Manufacturing Company, Inc., Woodstock, N.Y., a corporation of New York
Filed Mar. 11, 1959, Ser. No. 798,714
4 Claims. (Cl. 160—369)

This invention relates to a mounting means for fans, and more especially to small ventilating fans used to ventilate enclosures containing electronic equipment.

It has been found to be desirable to assemble electronic equipment in containers or "packages." Such electronic equipment often must be assembled to occupy the smallest possible space, especially for use on shipboard or on aeroplanes where space is at a premium. Because of the space limitations, the heat developed by the electronic equipment in use cannot be readily dissipated without the use of a ventilating fan, or fans, to circulate cooling air through the enclosure.

Sometimes it is desirable to blow air into the enclosure, and sometimes it is desirable to blow air out of the enclosure; and it may be desired, when blowing air into the enclosure, to provide a filter on the suction or intake side of the fan to eliminate dust.

It is an object, therefore, of the present invention to provide a frame in which the fan is mounted, and clips to be secured to a panel, or the like, between which the frame may be readily positioned and held to blow in the desired direction and, when necessary, to provide for mounting of a filter element and a screen.

It is a further object to provide such a device that is inexpensive to manufacture, easy to install and efficient in operation.

Other and further objects and advantages will become apparent from the following specification taken with the accompanying drawings in which like characters of reference denote similar parts in the several views and in which:

FIG. 1 is an exploded perspective view of the device, partly broken away;

FIG. 2 is a section through an assembled device showing the frame mounted in the clips with an air filter and screen;

FIG. 3 is a section of a clip taken on line 3—3 of FIG. 1; and

FIG. 4 is an elevation of the device installed.

While the illustrations and description is of a fan mounted by means of the present invention, it will be understood that other appropriate electrical devices may also be mounted by use of the structure described.

Referring more particularly to the drawings, and especially to FIG. 1 thereof, it will be seen that a fan, or the like, is mounted in a frame or block 1. An aperture 2 is provided in a panel 3 in which it is desired to mount the fan.

A clip 4 made, for example, of spring steel is mounted at each side of aperture 2 of the panel 3 to receive frame or block 1 therebetween by means of an integral flange portion against the face of panel 3 so that the thickness of panel 3 is immaterial. Any conventional securing means such as bolts or screws may be used to secure the clips to the panel.

Each clip 4 includes a portion 5 that extends from the outer surface of panel 3 into or through the aperture 2. From portion 5 are struck the various elements by which the frame or block 1 and ancillary devices are mounted.

Each extreme end of portion 5 is bent inwardly, that is, toward the aperture, to form guides 6, 6'. The end of guides 6, 6', nearest the face of panel 3 is bent slightly outwardly as at 7, 7', to facilitate use of the guides, and the other end is bent slightly inwardly as at 8, 8', to insure a tight grip on the frame 1.

Frame or block 1 is provided with spaced slots 9, 9', to receive and run on the guides 6, 6'.

Portion 5, it will be noted from FIG. 3, is not at a 90° angle to the face of panel 3 so that the insertion of frame 1 into the aperture 2 between the clips 4 forces portions 5 apart to assure a resilient pressure against frame 1.

A pair of locking lugs 10, 10' are provided on a spring panel 11. From FIG. 3 it will be noted that panel 11 is bent inwardly from portion 5 along line A—A of FIG. 1.

Frame 1 is provided with cam surfaces 12, 12a, 12', 12a', which are arranged so that, as the same is inserted between clips 4, cam surfaces 12, 12', or if the frame is turned around, 12a and 12a', contact locking lugs 10, 10'. As shown in FIGS. 1 and 2, the fan is inserted so as to blow into a space enclosed by panels.

Adjacent cam surfaces 12, 12', are depressions 13, 13', respectively, into which locking lugs 10, 10', drop by spring pressure after they have been cammed apart by cam surfaces 12, 12', as the frame 1 is thrust into aperture 2 between portion 5 of clips 4. The location of locking lugs 10, 10', and depressions 13, 13', are such with respect to the panel 3 and frame 1 that when locking lugs 10, 10' are engaged in depressions 13, 13', the face of frame 1 is substantially flush with the outer surface of panel 3.

If, then, the panels 11 are sprung apart as by insertion of a tool between frame 1 and the portion 5, the locking lugs may be retracted from depressions 13, 13', and the frame 1 can be thrust further through aperture 2 to bring locking lugs 10, 10' into engagement with depressions 13a, and 13a'. The location of depressions 13a and 13a' on frame 1 are such that, when they are engaged with lugs 10, 10', the face of frame 1 lies a distance below, or spaced from, the surface of panel 3 such that an air filter 14, as seen in FIG. 2, may be inserted in aperture 2 with its outer surface flush with the outer surface of panel 3.

When the fan is positioned in the device to blow outwardly, by turning frame 1 around 180° from the position shown in FIGS. 1 and 2, the locking lugs 10, 10' will be cammed into depressions 13b and 13b' so that the frame lies flush with the outer surface of panel 3. There is no need in this case to provide a filter so no other position than the one is provided for.

Between portion 5 and the flange portion of the device that overlies the face of panel 3, and connecting the portions 5 to the flange, are walls 15, 16, that provide a space, as seen in FIG. 2, into which a flange 17, of screen holding cover 18, extends. Cover 18 is provided with an outwardly extending marginal frame portion that is of sufficient size to overlie the flanges of the clips 4. This frame may be recessed as at 19 to clear clips 4 so that its lower surface at its edge is against the surface of panel 3.

Flange 17 of the cover is provided with a recess 20 into which detents 21 and 21', snap when the screen holding frame is mounted by inserting flange 17 into the space provided by walls 15, 16. Detents 21 and 21' are formed by a bend near the end of spring fingers 22, 22', struck from the material of the clip before it is bent to provide walls 15, 16, and it will be noted that the aperture in the clip, from which the detent 21 was struck, includes parts of walls 15 and 16.

FIG. 4 shows that the completed assembly of the fan in the panel 3 is neat and finished in appearance. It shows no indication of securing means yet the entire assemblage is readily accessible for cleaning or replacement.

With respect to the locking lugs 10, 10', it will be noted that they may be either a positive locking type, as shown in FIG. 3, or they may be in the form of detents having sloping sides which, upon sufficient thrust being applied, will cam out of depressions 13, 13', etc. to facilitate adjustment of the frame or block 1 in the aperture 2.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. For use in combination with a panel having an opening therein, the improvement in mounting means adapted for fans comprising a pair of mounting clips secured to said panel and extending into said opening, a frame, having upper and lower slots mounted in said opening by said clips, a guide portion of each of said clips extending into said opening, upper and lower bent edges of each said guide portion engaged respectively in said upper and lower slots of said frame whereby said frame is resiliently held between said guide portions and positioned with respect to said clips by said bent edges; a spring panel on each said clip formed from a central part of said guide portion biased toward said frame, locking lugs formed on said spring panels, a plurality of spaced, aligned, cam surfaces formed in the edges of said frame to contact said lugs upon insertion of said frame into said opening between said mounting clips, and a plurality of aligned depressions in said frame in alignment with said cam surfaces in which said lugs will engage to position said frame between said clips in a plurality of selected and reversible positions.

2. In combination, a panel or the like having an opening therein, a pair of mounting clips secured to said panel and extending into said opening, a frame having upper and lower slots mounted in said opening by said clips, a guide portion of each of said clips extending into said opening, upper and lower bent edges of each said guide portion engaged respectively in said upper and lower slots of said frame whereby said frame is resiliently held between said guide portions and positioned with respect to said clips by said bent edges; a spring panel on each said clip formed from a central part of said guide portion biased toward said frame, locking lugs formed on said spring panels, a plurality of spaced, aligned, cam surfaces formed in the edges of said frame to contact said lugs upon insertion of said frame into said opening between said mounting clips, and a plurality of aligned depressions in said frame in alignment with said cam surfaces in which said lugs will engage to position said frame between said clips in a plurality of selected and reversible positions.

3. The combination of claim 2 and also including a filter screen mounted to cover said opening, a screen frame therefor having flange portions, said mounting clips being provided with spring detents struck from a section of said guide portions and said flange portions including complementary detent structure extending into said opening between said frame and said clip.

4. In combination: a panel or the like, an opening formed in said panel; a pair of elongated mounting clips, a short arm of each of said mounting clips secured to said panel, a long arm of each of said mounting clips extending into said opening, said mounting clips each formed of spring material with said short arm and said long arm forming an L cross-section of each of said mounting clips, upper and lower bent edges of said longer arm projecting inwardly, a central portion of said longer arm forming a spring panel, detent bosses on said spring panel, a pair of spring detents struck from said longer arm and extending toward the intersection of said short and long arms; a frame, slots formed in said frame engaging said bent edges, cam surfaces formed on said frame, a plurality of detent boss-receiving recesses in alignment with each said cam surface, said boss-receiving recesses engaging said detent bosses to position said frame in said opening; a screen, a flange of said screen, detent-receiving depressions of said flange engaging said spring detents and removably fixing said screen in position covering said opening with said flange between said frame and said elongated mounting clips.

References Cited in the file of this patent

UNITED STATES PATENTS

| | | |
|---|---|---|
| 2,374,622 | Rugg | Apr. 24, 1945 |
| 2,703,662 | Meyer | Mar. 8, 1955 |